US008823998B2

(12) United States Patent
Huang

(10) Patent No.: US 8,823,998 B2
(45) Date of Patent: Sep. 2, 2014

(54) IDENTIFICATION CODE PRINTING METHOD AND PRINTING APPARATUS

(75) Inventor: Yu-Cheng Huang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 326 days.

(21) Appl. No.: 13/380,854

(22) PCT Filed: Dec. 5, 2011

(86) PCT No.: PCT/CN2011/083493
§ 371 (c)(1), (2), (4) Date: Dec. 25, 2011

(87) PCT Pub. No.: WO2013/078706
PCT Pub. Date: Jun. 6, 2013

(65) Prior Publication Data
US 2013/0135682 A1 May 30, 2013

(30) Foreign Application Priority Data
Nov. 29, 2011 (CN) .......................... 2011 1 0387510

(51) Int. Cl.
*G06F 15/00* (2006.01)
*G06K 1/00* (2006.01)
*G06K 15/00* (2006.01)

(52) U.S. Cl.
USPC ........................... 358/1.18; 358/1.12; 358/1.1

(58) Field of Classification Search
USPC ............. 358/1.1, 1.11, 1.12, 1.13, 1.14, 1.15, 358/1.16, 1.17, 1.18
See application file for complete search history.

(56) References Cited

U.S. PATENT DOCUMENTS

2003/0043337 A1 3/2003 Takabayashi
2004/0263769 A1 12/2004 Lee et al.

FOREIGN PATENT DOCUMENTS

| | | | |
|---|---|---|---|
| CN | 1575439 | A | 2/2005 |
| CN | 1758121 | A | 4/2006 |
| CN | 1288502 | C | 12/2006 |
| CN | 101109860 | A | 1/2008 |
| CN | 101117274 | A | 2/2008 |
| CN | 101372391 | A | 2/2009 |
| CN | 101844864 | A | 9/2010 |
| JP | 2002-43703 | A | 2/2002 |

*Primary Examiner* — Thierry L Pham
(74) *Attorney, Agent, or Firm* — Cheng-Ju Chiang

(57) ABSTRACT

An identification (ID) code printing method for a glass substrate is disclosed, which comprises the following steps: loading a glass substrate onto a front end of a platform; aligning the glass substrate at the front end of the platform; printing an ID code on the glass substrate for three times in a process of moving the glass substrate from the front end of the platform to a back end of the platform, then from the back end of the platform to the front end of the platform and finally again from the front end of the platform to the back end of the platform. An ID code printing apparatus for a glass substrate is further disclosed. Thereby, an additional cycle of ID code printing operations can be carried out in the present disclosure as compared to the prior art, which can increase the number of times of ID code printing under the conventional tact time conditions and improve the utilization factor of the production line.

11 Claims, 4 Drawing Sheets

IDENTIFICATION CODE PRINTING METHOD AND PRINTING APPARATUS

FIELD OF THE INVENTION

The present disclosure generally relates to the technical field of liquid crystal displaying, and more particularly, to an identification (ID) code printing method and an ID code printing apparatus for a glass substrate.

BACKGROUND OF THE INVENTION

In the manufacturing process of liquid crystal displays (LCDs), there is a procedure of printing ID codes before slicing a large-size glass substrate, which includes providing a substrate ID for the large-size glass substrate itself ("substrate ID") and providing panel IDs for small-size panels to be sliced from the large-size glass substrate ("panel IDs"). Each of the substrate ID code and the panel ID codes mainly consists of universal characters for identification by operators and two-dimensional (2D) symbols for identification by machines. These ID codes serve as identification marks of the related glass substrate and the panels, and are used for identification of the related glass substrate and the panels.

In the prior art, an alignment device for aligning the glass substrate is disposed at a back end of a platform. Therefore, in a process between loading the glass substrate to the platform and unloading the substrate from the platform, the printing operation is carried out only once when the glass substrate is conveyed from the back end to a front end of the platform and once when the glass substrate is conveyed from the front end to the back end of the platform. Therefore, the ID code printing operation is carried out on the glass substrate only twice in each flow process. However, as the sizes of glass substrates become increasingly larger in practical manufacturing processes, the number of panels of specific sizes that can be provided by each glass substrate also becomes increasingly larger, and this requires printing the ID codes more times under the same tact time conditions.

Furthermore, although printing of ID codes can be accomplished by increasing the number of printing laser heads or by simply increasing the number of times of printing when the number of panels to be sliced from a glass substrate is large, this will add to the production cost and decrease the production efficiency.

SUMMARY OF THE INVENTION

The primary objective of the present disclosure is to provide an identification (ID) code printing method and an ID code printing apparatus for a glass substrate, which can increase the number of times of ID code printing under the same tact time conditions, reduce the production cost and improve the production efficiency.

To achieve the aforesaid objective, the present disclosure provides an ID code printing apparatus, which comprises:

a platform, being adapted to support a glass substrate;

a transmission mechanism, being adapted to convey the glass substrate from a front end of the platform to a back end of the platform or from the back end of the platform to the front end of the platform;

a locating mechanism disposed at the front end of the platform, being adapted to locate the glass substrate when the glass substrate is loaded to the front end of the platform;

an ID code printing mechanism disposed above the platform, being adapted to print an ID code on the glass substrate;

a rotating mechanism, being adapted to rotate the glass substrate by 90° after a first time of ID code printing; and an exposure mechanism, being adapted to expose the glass substrate to remove a photoresist from peripheral edges of the glass substrate.

Preferably, the ID code printing mechanism comprises: a printing module comprising a plurality of laser heads; a driving module connected with the printing module, being adapted to drive the printing module to print a substrate ID code and/or a panel ID code on the glass substrate when the glass substrate is moved from the front end of the platform to the back end of the platform, and to print a panel ID code on the glass substrate when the glass substrate is moved from the back end of the platform to the front end of the platform; and a fixing module, being adapted to fix the ID code printing mechanism above the platform.

To achieve the aforesaid objective, the present disclosure further provides an ID code printing method, which comprises the following steps of:

loading a glass substrate onto a front end of a platform;

aligning the glass substrate at the front end of the platform;

printing an ID code on the glass substrate for a first time when the glass substrate is moved from the front end of the platform to a back end of the platform;

printing an ID code on the glass substrate for a second time when the glass substrate that has been printed the first time is moved from the back end of the platform to the front end of the platform;

printing an ID code on the glass substrate for a third time when the glass substrate that has been printed the second time is moved from the front end of the platform to the back end of the platform; and outputting the glass substrate that has been printed the third time to a next process.

Preferably, in the step of printing an ID code on the glass substrate for a first time, a substrate ID code is printed and a panel ID code of a first cycle is printed;

in the step of printing an ID code on the glass substrate for a second time, a panel ID code of a second cycle is printed; and in the step of printing an ID code on the glass substrate for a third time, a panel ID code of a third cycle is printed.

Preferably, in the step of printing an ID code on the glass substrate for a first time, a panel ID code of a first cycle is printed;

in the step of printing an ID code on the glass substrate for a second time, a panel ID code of a second cycle is printed; and in the step of printing an ID code on the glass substrate for a third time, a substrate ID code is printed and a panel ID code of a third cycle is printed.

Preferably, upon completion of the step of printing an ID code on the glass substrate for a first time, the glass substrate is rotated by 90° before the step of printing an ID code on the glass substrate for a second time is carried out.

Preferably, when the step of printing an ID code on the glass substrate for a first time is being carried out, the glass substrate is exposed for a first time to remove a photoresist from edges of the glass substrate.

Preferably, when the step of printing an ID code on the glass substrate for a second time is being carried out, the glass substrate is exposed for a second time to remove a photoresist from the edges of the glass substrate.

To achieve the aforesaid objective, the present disclosure further provides an ID code printing apparatus, which comprises:

a platform, being adapted to support a glass substrate;

a transmission mechanism, being adapted to convey the glass substrate from a front end of the platform to a back end of the platform or from the back end of the platform to the front end of the platform;

a locating mechanism disposed at the front end of the platform, being adapted to locate the glass substrate when the glass substrate is loaded to the front end of the platform; and an ID code printing mechanism disposed above the platform, being adapted to print an ID code on the glass substrate.

Preferably, the ID code printing mechanism comprises:

a printing module comprising a plurality of laser heads;

a driving module connected with the printing module, being adapted to drive the printing module to print a substrate ID code and/or a panel ID code on the glass substrate when the glass substrate is moved from the front end of the platform to the back end of the platform, and to print a panel ID code on the glass substrate when the glass substrate is moved from the back end of the platform to the front end of the platform; and a fixing module, being adapted to fix the ID code printing mechanism above the platform.

Preferably, the ID code printing apparatus further comprises a rotating mechanism, being adapted to rotate the glass substrate by 90° after a first time of ID code printing.

Preferably, the ID code printing apparatus further comprises an exposure mechanism, being adapted to expose the glass substrate to remove a photoresist from peripheral edges of the glass substrate.

The present disclosure has the following benefits as compared to the prior art: the aligning operation on the glass substrate is carried out at the front end of the platform in embodiments of the present disclosure, i.e., carried out immediately once the glass substrate is loaded on the platform instead of after the glass substrate is conveyed to the back end of the platform; and then in the process of moving the glass substrate to the back end, then back to the front end and finally again to the back end of the platform after completion of the alignment, three ID code printing operations can be carried out. As compared to the prior art, the number of times of ID code printing operations increases from two to three under the same tact time conditions, and a cycle of ID code printing operations is additionally carried out. This can achieve the purpose of printing ID codes on more panels, and reduce the production cost and improve the production efficiency. Furthermore, because more small-size panels can be accommodated by a single glass substrate for production lines of high generations, increasing the number of times of ID code printing can save use of more laser heads, reduce the cost and improve the utilization factor of the production line.

DETAILED DESCRIPTION OF THE INVENTION

Figure 1:
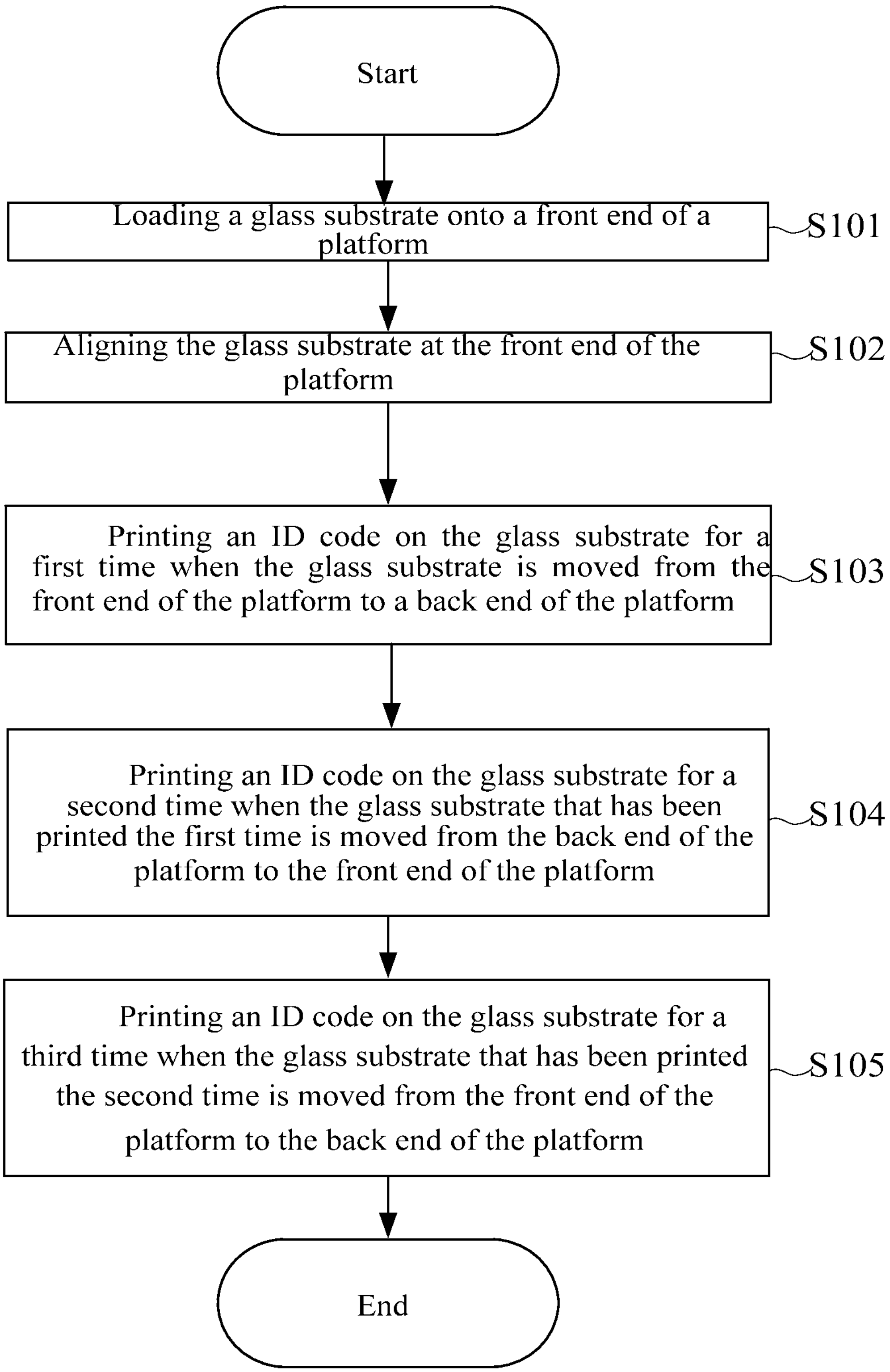
FIG. 1 is a flowchart diagram of an embodiment of an ID code printing method for a glass substrate according to the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Hereinafter, embodiments of the ID code printing method and the ID code printing apparatus for a glass substrate will be detailed to describe the details and spirits of the present disclosure more clearly.

FIG. 1 is a flowchart diagram of an embodiment of an ID code printing method for a glass substrate according to the present disclosure. Referring to FIG. 1, the embodiment of the ID code printing method for a glass substrate of the present disclosure comprises:

step S101: loading a glass substrate onto a front end of a platform;

step S102: aligning the glass substrate at the front end of the platform;

step S103: printing an ID code on the glass substrate for a first time when the glass substrate is moved from the front end of the platform to a back end of the platform;

step S104: printing an ID code on the glass substrate for a second time when the glass substrate that has been printed the first time is moved from the back end of the platform to the front end of the platform; and step S105: printing an ID code on the glass substrate for a third time when the glass substrate that has been printed the second time is moved from the front end of the platform to the back end of the platform; and outputting the glass substrate that has been printed the third time to a next process.

Figure 2:
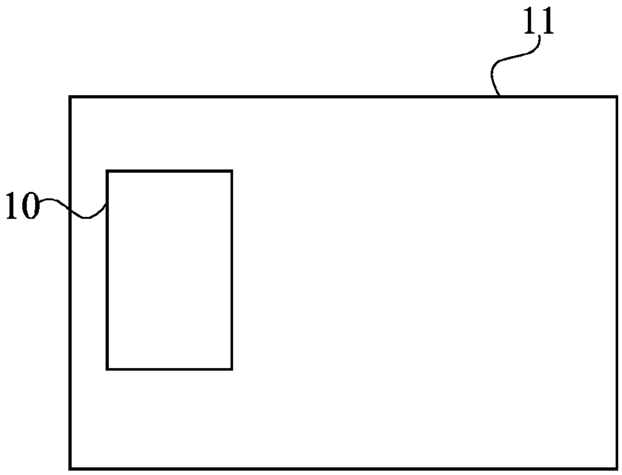
FIG. 2 is a schematic view illustrating the step of loading a glass substrate onto a platform in the embodiment of the ID code printing method for a glass substrate according to the present disclosure.

In order to make technical solutions of the present disclosure more clearly, the present disclosure will be detailed with reference to the attached drawings FIG. 2 to FIG. 8. Referring firstly to FIG. 2, the process starts with the step S101 where the glass substrate 10 is conveyed to the front end of the platform 11 with the glass substrate 10 being kept in an original direction in which the glass substrate 10 is arranged before being loaded.

In this embodiment, the glass substrate 10 is loaded onto the platform 11 in a direction perpendicular to a short side thereof. Of course, the glass substrate 10 may also be loaded onto the platform 11 in a direction perpendicular to a long side thereof in other embodiments, and the present disclosure has no limitation on this.

Figure 3:
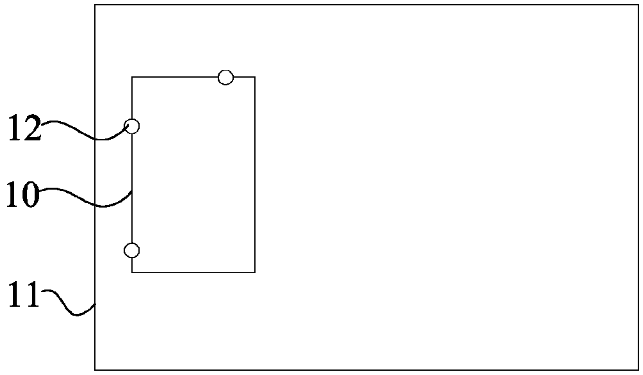
FIG. 3 is a schematic view illustrating the step of aligning the glass substrate in the embodiment of the ID code printing method for a glass substrate according to the present disclosure.

Referring to FIG. 3, in the step S102, the glass substrate 10 placed at the front end of the platform 11 is aligned through use of an alignment device 12. Specifically, for example, the alignment device 12 may be a charge-coupled device (CCD), and may be fixedly disposed at the front end of the platform 11 to align the glass substrate 10. Alternatively, the alignment device 12 may also be disposed near the platform 11, in which case the alignment device 12 is moved to the front end of the platform 11 to locate the glass substrate 10 when the glass substrate 10 is loaded onto the platform 11.

Figure 4:
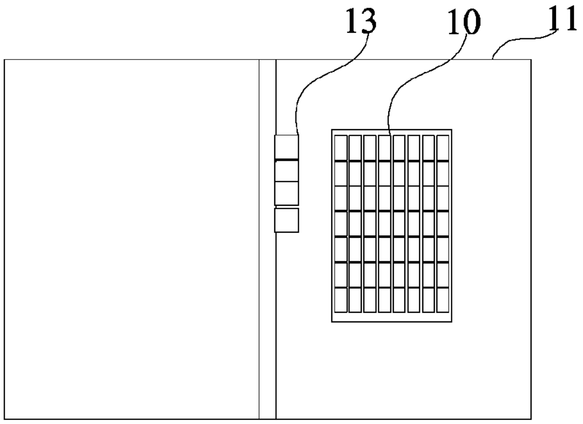
FIG. 4 is a schematic view illustrating the step of printing on the glass substrate for a first time in the embodiment of the ID code printing method for a glass substrate according to the present disclosure.

Referring to FIG. 4, in the step S103, the glass substrate 10 is conveyed to the back end of the platform 11 with an ID code printing mechanism and an exposure mechanism being disposed above the platform 11 so that an ID code is printed on the glass substrate 10 for a first time. It shall be appreciated that, the printing apparatus can print a substrate ID code and a panel ID code simultaneously on the glass substrate 10 or only print the panel ID code in a first printing cycle.

When the step of printing an ID code on the glass substrate 10 for a first time is being carried out, the glass substrate 10 is exposed for a first time to remove a photoresist from peripheral edges of the glass substrate 10. In order to print an ID code on the glass substrate 10, laser heads 13 are required. Taking a printing apparatus having four laser heads 13 as an example, each of the laser heads 13 can print a panel ID code on a panel eighteen times in one flow process.

In the practical manufacturing process, a large-size glass substrate comprises a plurality of small-size panel regions, and is sliced into a plurality of small-size panels after completion of the processing procedure. Taking the 8.5 generation manufacturing line as an example, a glass substrate on the 8.5 generation manufacturing line has dimensions of 2500 mm×2200 mm, and the 8.5 generation manufacturing line is provided with four laser heads 13. In principle, a minimum printing distance between each two adjacent ID codes is 135 mm, so the ID code printing operation can be carried out eighteen times (2500/135=18.51) at most in one flow process when the laser heads 13 print the ID code along the long sides of the glass substrate 10. Furthermore, if the glass substrate is moved in the same direction as it is unloaded from the platform, then the ID code printing operation can be carried out on the glass substrate and the panel simultaneously.

In the prior art, the printing operation can be carried out only twice. Taking the printing apparatus having four laser heads 13 as an example still, ID codes can be printed only on 4×18×2=144 panels and one glass substrate at most in one flow process. In contrast, according to the present disclosure, the printing operation can be carried out thrice and the ID code printing operation can be carried on 4×18×3=216 panels and one glass substrate at most in one flow process, so an additional cycle of ID code printing can be accomplished. Thus, the present disclosure can increase the number of times of printing and improve the production efficiency under the same tact time conditions.

Furthermore, in embodiments of the present disclosure, the number of the laser heads is not limited to four as listed above, and may be determined by the number of the panels on the glass substrate when the laser heads 13 are used to print the ID code on the glass substrate 10. Specifically, taking a case in which a glass substrate has 4×6 26-inch panels and the printing apparatus is provided with two laser heads as an example, the two laser heads may be used to carry out the ID code printing operation on 4×3 panels firstly and then on the remaining 3×4 panels after the glass substrate is rotated; and in this case two cycles of printing operation are needed. On the other hand, when the number of the laser heads is four, printing operations of the two cycles described above can be accomplished in a single cycle.

Figure 5:
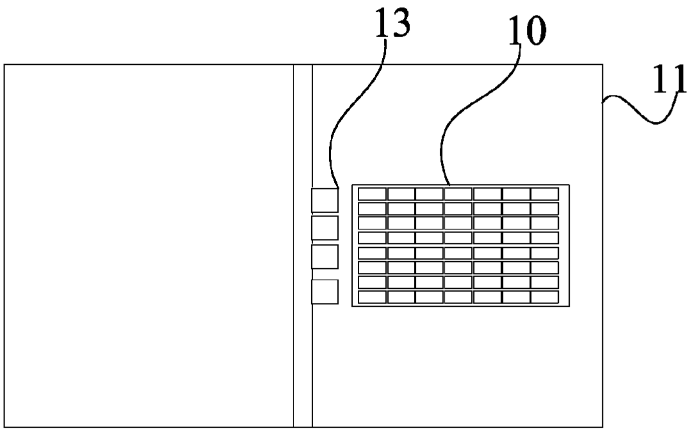
FIG. 5 is a schematic view illustrating the step of rotating the glass substrate in the embodiment of the ID code printing method for a glass substrate according to the present disclosure.

As shown in FIG. 5, the glass substrate 10 is rotated within a plane of the platform 11. Specifically, the glass substrate 10 needs to be rotated once when the glass substrate 10 has moved from the front end of the platform 11 to the back end of the platform 11 and has been exposed once. The glass substrate 10 may be rotated either in a clockwise direction or in an anticlockwise direction by 90° within a plane parallel to the platform 11. The purpose of exposing the four peripheral edges of the glass substrate 10 may also be achieved by only changing the exposure direction of the exposure mechanism without rotating the glass substrate 10.

Figure 6:
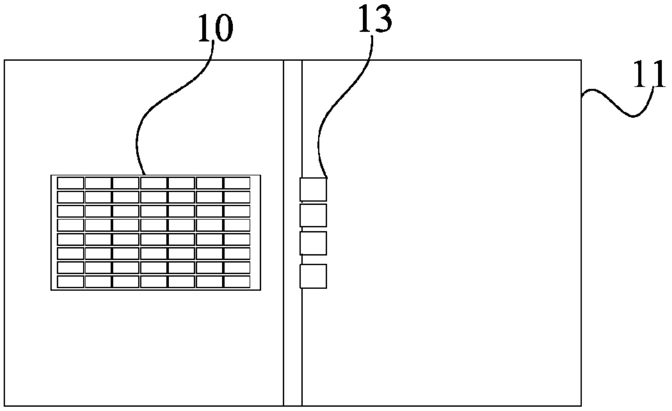
FIG. 6 is a schematic view illustrating the step of printing on the glass substrate for a second time in the embodiment of the ID code printing method for a glass substrate according to the present disclosure.

Referring to FIG. 6, in the step S104, the glass substrate 10 is conveyed to the front end of the platform 11 so that the glass substrate 10 is printed with an ID code for a second time. When the step of printing an ID code on the glass substrate 10 for a second time is being carried out, the glass substrate 10 is exposed for a second time to remove a photoresist from the peripheral edges of the glass substrate 10. In the second printing cycle, the ID code printing mechanism prints a panel ID code on the glass substrate 10.

In the step S105, an ID code is printed on the glass substrate for a third time when the glass substrate that has been printed the second time is moved from the front end of the platform to the back end of the platform; and the glass substrate that has been printed the third time is outputted to a next process.

In a third printing cycle, the ID codes printed on the glass substrate 10 by the ID code printing mechanism may include a substrate ID code and/or panel ID codes. In the present disclosure, it is necessary to complete printing of the substrate ID code before the substrate is unloaded. That is, if the substrate ID code is not printed in the first printing cycle shown in step S103, then the substrate ID code will be printed in the third printing cycle; and if the substrate ID code has already been printed in the first printing cycle, then only the panel ID codes will be printed in the third printing cycle.

Figure 7:
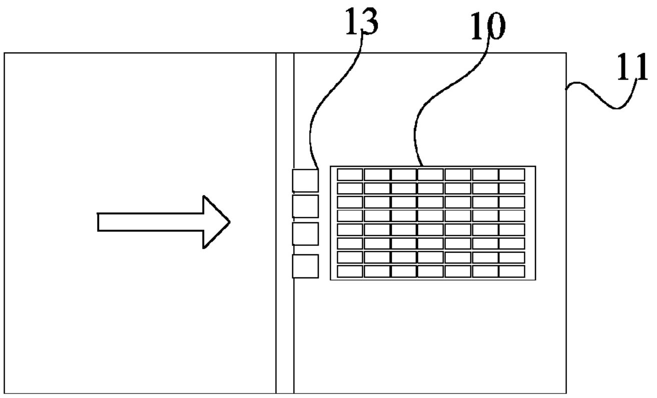
FIG. 7 is a schematic view illustrating the step of printing on the glass substrate for a third time in the embodiment of the ID code printing method for a glass substrate according to the present disclosure.

In detail, as shown in FIG. 7, the glass substrate 10 is conveyed to the back end of the platform 11 and an ID code is printed on the glass substrate 10 for a third time.

Figure 8:
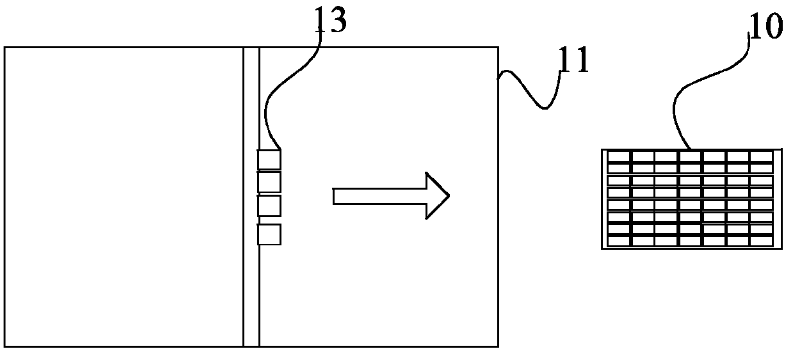
FIG. 8 is a schematic view illustrating the step of unloading the glass substrate from the platform and outputting the glass substrate to a next process in the embodiment of the ID code printing method for a glass substrate according to the present disclosure.

As shown in FIG. 8, after the step of printing an ID code on the glass substrate 10 for a third time is completed, the glass substrate 10 is outputted to a next process from the back end of the platform 11 to complete the printing of the substrate ID code or panel ID codes on the glass substrate.

An embodiment of the ID code printing apparatus for a glass substrate of the present disclosure will be detailed hereinafter.

Figure 9:
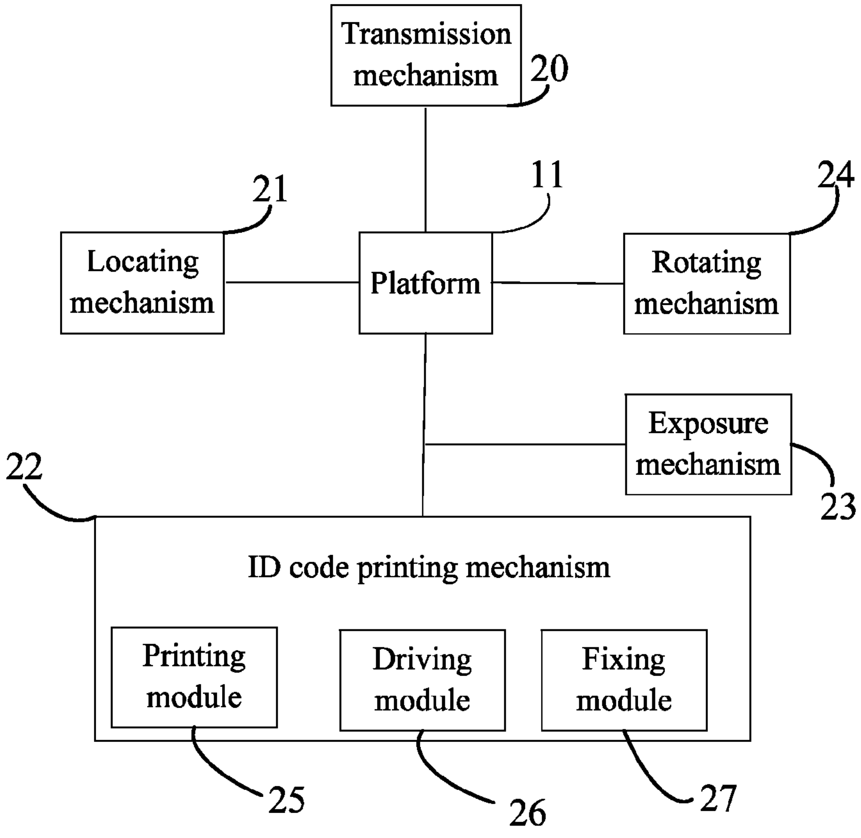
FIG. 9 is a schematic structural view of an embodiment of an ID code printing apparatus for a glass substrate according to the present disclosure.

FIG. 9 is a schematic structural view of an embodiment of the ID code printing apparatus for a glass substrate according to the present disclosure.

As shown in FIG. 9, the embodiment of the ID code printing apparatus for a glass substrate of the present disclosure comprises a platform 11 adapted to support a glass substrate, a transmission mechanism 20, a locating mechanism 21, an ID code printing mechanism 22, an exposure mechanism 23 and a rotating mechanism 24.

The transmission mechanism 20 is mainly adapted to convey the glass substrate. In detail, the transmission mechanism 20 can convey the glass substrate from a front end of the platform 11 to a back end of the platform 11 or, conversely, from the back end of the platform 11 to the front end of the platform 11 to assist other mechanisms in accomplishing a series of flow processes including the alignment operation, the exposure operation and the ID code printing operation on the glass substrate.

The locating mechanism 21 is disposed at the front end of the platform 11 to locate the glass substrate when the glass substrate is loaded to the front end of the platform 11.

The core component of the locating mechanism 21 is a photosensitive device such as a charge-coupled device. In detail, the sensitive device may be disposed, for example, above the front end of the platform 11 to locate the glass substrate.

The ID code printing mechanism 22 comprises a printing module 25, a driving module 26 and a fixing module 27.

The printing module 25 comprises laser heads (e.g., four laser heads arranged in a horizontal direction) located above the platform 11. The four laser heads are arranged in a plane parallel to the platform and in a direction perpendicular to the moving direction of the glass substrate on the platform 11 so that, when the glass substrate passes beneath the row of the laser heads, the four laser heads can carry out printing operations in parallel on the glass substrate to print ID codes on four rows of panels on the glass substrate. As another example, if the number of the panels in each row is eighteen, then eighteen printing operations are carried out by each of the laser heads when the glass substrate passes beneath the laser heads once. As the minimum distance between two adjacent laser heads may be set to be 135 mm, the minimum distance between two adjacent ID codes printed is 135 mm correspondingly.

The driving module 26 is adapted to drive the printing module 25 to print the ID code on the glass substrate for a first time when the glass substrate is moved from the front end of the platform 11 to the back end of the platform 11, to print the ID code on the glass substrate for a second time when the glass substrate is moved from the back end of the platform 11 to the front end of the platform 11 then, and to print the ID code on the glass substrate for a third time when the glass substrate is moved from the front end of the platform 11 to the back end of the platform 11 finally.

The fixing module 27 is adapted to fix the ID code printing mechanism 22 above the platform 11.

The exposure mechanism 23 is disposed above the platform 11, and the exposure mechanism 23 may be formed integrally with the ID code printing mechanism 22 in this embodiment. In the process of moving the glass substrate from the front end of the platform 11 to the back end of the platform 11 for a first time and then from the back end of the platform 11 to the front end of the platform 11, the exposure mechanism 23 accomplishes exposure of the glass substrate twice to remove a photoresist from edges of the glass substrate, which can avoid the potential physical reaction occurred between the photoresist of the peripheral edges and the surrounding environment in subsequent manufacturing processes and decrease the rejection ratio of the panels.

The rotating mechanism 24 is disposed at the back end of the glass substrate, and is adapted to rotate the glass substrate by 90° upon completion of the step of printing an ID code on the glass substrate for a first time so that the step of printing an ID code on the glass substrate for a second time is carried out then. In the rotating process, the glass substrate may be rotated either in a clockwise direction or in an anticlockwise direction.

As compared to the prior art, the present disclosure has the locating mechanism disposed at or moved to the front end of the platform to align the glass substrate at the front end of the platform and, after completion of the alignment, the glass substrate is moved to the back end of the platform of the present manufacturing process to print an ID code on the glass substrate for a first time. Then, the glass substrate is conveyed to the front end from the back end of the platform to print an ID code on the glass substrate for a second time. Finally, the glass substrate is conveyed to the back end from the front end of the platform to print an ID code on the glass substrate for a third time. As compared to the prior art, the number of times of ID code printing operations increases from two to three under the same tact time conditions, and a cycle of ID code printing operations is additionally carried out. This can achieve the purpose of printing ID codes on more panels, and reduce the production cost and improve the production efficiency. Furthermore, because more small-size panels can be accommodated by a single glass substrate for production lines of high generations, increasing the number of times of ID code printing can save use of more laser heads, reduce the cost and improve the utilization factor of the production line.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An identification (ID) code printing apparatus, comprising:

a platform, being adapted to support a glass substrate;

a transmission mechanism, being adapted to convey the glass substrate from a front end of the platform to a back end of the platform or from the back end of the platform to the front end of the platform;

a locating mechanism disposed at the front end of the platform, being adapted to locate the glass substrate when the glass substrate is loaded to the front end of the platform;

an ID code printing mechanism disposed above the platform, being adapted to print an ID code on the glass substrate;

a rotating mechanism, being adapted to rotate the glass substrate by 90° after a first time of ID code printing; and an exposure mechanism, being adapted to expose the glass substrate to remove a photoresist from peripheral edges of the glass substrate.

2. The ID code printing apparatus of claim 1, wherein the ID code printing mechanism comprises:

a printing module comprising a plurality of laser heads;

a driving module connected with the printing module, being adapted to drive the printing module to print a substrate ID code and/or a panel ID code on the glass substrate when the glass substrate is moved from the front end of the platform to the back end of the platform, and to print a panel ID code on the glass substrate when the glass substrate is moved from the back end of the platform to the front end of the platform; and a fixing module, being adapted to fix the ID code printing mechanism above the platform.

3. An identification (ID) code printing method, comprising the following steps of:

loading a glass substrate onto a front end of a platform;

aligning the glass substrate at the front end of the platform;

printing an ID code on the glass substrate for a first time when the glass substrate is moved from the front end of the platform to a back end of the platform;

printing an ID code on the glass substrate for a second time when the glass substrate that has been printed the first time is moved from the back end of the platform to the front end of the platform;

printing an ID code on the glass substrate for a third time when the glass substrate that has been printed the second time is moved from the front end of the platform to the back end of the platform; and outputting the glass substrate that has been printed the third time to a next process.

4. The ID code printing method of claim 3, wherein:

in the step of printing an ID code on the glass substrate for a first time, a substrate ID code is printed and a panel ID code of a first cycle is printed;

in the step of printing an ID code on the glass substrate for a second time, a panel ID code of a second cycle is printed; and in the step of printing an ID code on the glass substrate for a third time, a panel ID code of a third cycle is printed.

5. The ID code printing method of claim 3, wherein:

in the step of printing an ID code on the glass substrate for a first time, a panel ID code of a first cycle is printed;

in the step of printing an ID code on the glass substrate for a second time, a panel ID code of a second cycle is printed; and in the step of printing an ID code on the glass substrate for a third time, a substrate ID code is printed and a panel ID code of a third cycle is printed.

6. The ID code printing method of claim 3, wherein:

upon completion of the step of printing an ID code on the glass substrate for a first time, the glass substrate is rotated by 90° before the step of printing an ID code on the glass substrate for a second time is carried out.

7. The ID code printing method of claim 3, wherein:

when the step of printing an ID code on the glass substrate for a first time is being carried out, the glass substrate is exposed for a first time to remove a photoresist from edges of the glass substrate.

8. The ID code printing method of claim 6, wherein:

when the step of printing an ID code on the glass substrate for a second time is being carried out, the glass substrate is exposed for a second time to remove a photoresist from the edges of the glass substrate.

9. An identification (ID) code printing apparatus, comprising:

a platform, being adapted to support a glass substrate;

a transmission mechanism, being adapted to convey the glass substrate from a front end of the platform to a back end of the platform or from the back end of the platform to the front end of the platform;

a locating mechanism disposed at the front end of the platform, being adapted to locate the glass substrate when the glass substrate is loaded to the front end of the platform; and an ID code printing mechanism disposed above the platform, being adapted to print an ID code on the glass substrate;

wherein the ID code printing mechanism comprises:

a printing module comprising a plurality of laser heads;

a driving module connected with the printing module, being adapted to drive the printing module to print a substrate ID code and/or a panel ID code on the glass substrate when the glass substrate is moved from the front end of the platform to the back end of the platform, and to print a panel ID code on the glass substrate when the glass substrate is moved from the back end of the platform to the front end of the platform and a fixing module, being adapted to fix the ID code printing mechanism above the platform.

10. The ID code printing apparatus of claim 9, further comprising a rotating mechanism, being adapted to rotate the glass substrate by 90° after a first time of ID code printing.

11. The ID code printing apparatus of claim 9, further comprising an exposure mechanism, being adapted to expose the glass substrate to remove a photoresist from peripheral edges of the glass substrate.

* * * * *